United States Patent
Kang et al.

(10) Patent No.: US 12,434,565 B2
(45) Date of Patent: Oct. 7, 2025

(54) VEHICLE CONTROL APPARATUS FOR CONTROLLING FUEL CELL SYSTEM AND CONTROL METHOD THEREOF

(71) Applicants: HYUNDAI MOTOR COMPANY, Seoul (KR); KIA CORPORATION, Seoul (KR)

(72) Inventors: Jung Tak Kang, Incheon (KR); Yong Doo Son, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 510 days.

(21) Appl. No.: 17/903,353

(22) Filed: Sep. 6, 2022

(65) Prior Publication Data
US 2023/0302911 A1    Sep. 28, 2023

(30) Foreign Application Priority Data
Mar. 24, 2022 (KR) .......... 10-2022-0036901

(51) Int. Cl.
| | |
|---|---|
| *B60L 3/00* | (2019.01) |
| *H01M 8/04303* | (2016.01) |
| *H01M 8/04664* | (2016.01) |
| *H01M 8/04955* | (2016.01) |
| *H01M 8/04992* | (2016.01) |

(52) U.S. Cl.
CPC ....... *B60L 3/0053* (2013.01); *H01M 8/04303* (2016.02); *H01M 8/04671* (2013.01); *H01M 8/04955* (2013.01); *H01M 8/04992* (2013.01); *H01M 2250/20* (2013.01)

(58) Field of Classification Search
CPC ............ H01M 8/04298–04313; H01M 8/04664–04686; H01M 8/04694; H01M 8/04955–04992; B60L 3/00; B60L 3/0023; B60L 3/0053; B60L 58/10; B60L 58/30–40
See application file for complete search history.

(56) References Cited

U.S. PATENT DOCUMENTS

| | | | |
|---|---|---|---|
| 10,388,974 B2 | 8/2019 | Shiokawa et al. | |
| 2002/0018922 A1* | 2/2002 | Fuglevand | H01M 8/04701 429/444 |
| 2005/0012638 A1* | 1/2005 | Barbir | G08C 19/00 340/870.01 |

(Continued)

FOREIGN PATENT DOCUMENTS

| | | | |
|---|---|---|---|
| JP | 2007134146 A | * | 5/2007 |
| KR | 101989388 B | | 6/2019 |

OTHER PUBLICATIONS

Machine translation of Satake et al., JP 2007-134146. Originally published May 31, 2007. (Year: 2007).*

*Primary Examiner* — Nicole M. Buie-Hatcher
*Assistant Examiner* — Jacob Buchanan
(74) *Attorney, Agent, or Firm* — MCDONNELL BOEHNEN HULBERT & BERGHOFF LLP (57) ABSTRACT

The vehicle control apparatus identifies a fuel cell module in which an error occurs among fuel cell modules included in the fuel cell system and an error type, stops the fuel cell module in which the error occurs, except for a case where the same error consecutively occurs in the same fuel cell module among the fuel cell modules, and operates the fuel cell module, in which the error occurs, again.

14 Claims, 7 Drawing Sheets

(56) References Cited

U.S. PATENT DOCUMENTS

| | | | |
|---|---|---|---|
| 2007/0218327 A1* | 9/2007 | Ishikawa | H01M 8/04089 |
| | | | 429/444 |
| 2009/0325007 A1* | 12/2009 | Grover | H01M 8/04992 |
| | | | 429/432 |
| 2020/0266468 A1* | 8/2020 | Chang | H01M 8/04395 |

* cited by examiner

FIG.7

VEHICLE CONTROL APPARATUS FOR CONTROLLING FUEL CELL SYSTEM AND CONTROL METHOD THEREOF

CROSS-REFERENCE TO RELATED APPLICATION

This application claims the benefit of priority to Korean Patent Application No. 10-2022-0036901, filed in the Korean Intellectual Property Office on Mar. 24, 2022, the entire contents of which are incorporated herein by reference.

TECHNICAL FIELD

The present disclosure relates to a vehicle control apparatus for controlling a fuel cell system and a control method thereof, and more particularly, relates to technologies for controlling the fuel cell system included in a vehicle which travels by using hydrogen as a power source.

BACKGROUND

Recently, eco-friendly vehicles which travel by driving their motors using electricity obtained by reacting hydrogen and oxygen in the air rather than an internal combustion engine which uses fossil fuels, have been produced. A vehicle may use a fuel cell as a power source. Because there is no engine in the vehicle, exhaust gases and pollutants are not discharged.

The vehicle may include a fuel cell and a motor. The fuel cell may generate electricity and may supply the generated electricity to the motor. The vehicle may include a fuel cell system for power generation, which uses hydrogen as fuel. The fuel cell system may be a high-capacity system for power generation, which includes a plurality of fuel cell modules.

SUMMARY

When an error occurs in an existing fuel cell system, the entire fuel cell system is stopped and a module in which the error occurs is checked. When the error occurs in the existing fuel cell system, power generation efficiency and an operating rate of the fuel cell system may be reduced. Furthermore, because a fuel cell module in which the error does not occur is also stopped and then begins to be operated again in the process of stopping the entire fuel cell system when the error occurs in the existing fuel cell system, unnecessary energy consumption of the fuel cell system may be increased.

The present disclosure has been made to solve the above-mentioned problems occurring in the prior art while advantages achieved by the prior art are maintained intact.

An aspect of the present disclosure provides a vehicle control apparatus for controlling a fuel cell system for power generation to increase power generation efficiency and an operating rate of the fuel cell system in an efficient manner, despite an error occurring in the fuel cell system, and decrease unnecessary efficiency consumption of the fuel cell system and a control method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus may include a processor, and a memory storing instructions that, when executed by the processor, cause the processor to perform operations comprising identifying a fuel cell module in which an error occurs among fuel cell modules included in the fuel cell system and an error type, stopping the fuel cell module in which the error occurs, except for a case where the same error consecutively occurs in the same fuel cell module among the fuel cell modules, and operating the fuel cell module, in which the error occurs, again.

In an embodiment, each of the fuel cell modules may be composed of two fuel cells and one inverter.

In an embodiment, the error, which is momentary and temporary, occurring in the fuel cell module may be detected.

In an embodiment, information associated with a position or a serial number of the fuel cell module in which the error occurs may be stored.

In an embodiment, an error count for the fuel cell module in which the error occurs may be increased when the error is the same error occurring in the same fuel cell module.

In an embodiment, the error type may be divided into a power conversion device error, a fuel cell error, and a utility error depending on a position where the error occurs.

In an embodiment, whether to selectively operate or stop the each fuel cell module may be controlled.

In an embodiment, only the fuel cell module in which the error occurs may be operated again when a degree of the error occurring in a power conversion device is less than or equal to a threshold numerical value and the number of times the error occurs is less than or equal to a threshold number of times, when the error type is a power conversion device error occurring in the power conversion device.

In an embodiment, only the fuel cell module in which the error occurs may be operated again when the error occurring in a fuel cell is the other error except for a hydrogen- or coolant-related error and the number of times the error occurs is less than or equal to a threshold number of times, when the error type is a fuel cell error occurring in the fuel cell.

In an embodiment, the fuel cell module in which the error occurs may be stopped, when the error type is a utility error associated with hydrogen supply and integrated cooling.

According to another aspect of the present disclosure, a control method of a fuel cell system may include identifying a fuel cell module in which an error occurs among fuel cell modules included in the fuel cell system and an error type, stopping the fuel cell module in which the error occurs, except for a case where the same error consecutively occurs in the same fuel cell module among the fuel cell modules, and operating the fuel cell module, in which the error occurs, again.

In an embodiment, each of the fuel cell modules may be composed of two fuel cells and one inverter.

In an embodiment, the error, which is momentary and temporary, occurring in the fuel cell module may be detected.

In an embodiment, information associated with a position or a serial number of the fuel cell module in which the error occurs may be stored.

In an embodiment, an error count for the fuel cell module in which the error occurs may be increased when the error is the same error occurring in the same fuel cell module.

In an embodiment, the error type may be divided into a power conversion device error, a fuel cell error, and a utility error depending on a position where the error occurs.

In an embodiment, whether to selectively operate or stop the each fuel cell module may be controlled.

In an embodiment, only the fuel cell module in which the error occurs may be operated again when a degree of the error occurring in a power conversion device is less than or equal to a threshold numerical value and the number of times the error occurs is less than or equal to a threshold number of times, when the error type is a power conversion device error occurring in the power conversion device.

In an embodiment, only the fuel cell module in which the error occurs may be operated again when the error occurring in a fuel cell is the other error except for a hydrogen- or coolant-related error and the number of times the error occurs is less than or equal to a threshold number of times, when the error type is a fuel cell error occurring in the fuel cell.

In an embodiment, the fuel cell module in which the error occurs may be stopped, when the error type is a utility error associated with hydrogen supply and integrated cooling.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein are to be interpreted as is customary in the art to which the present disclosure belongs.

Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIGS. 1 to 7.

Figure 1:
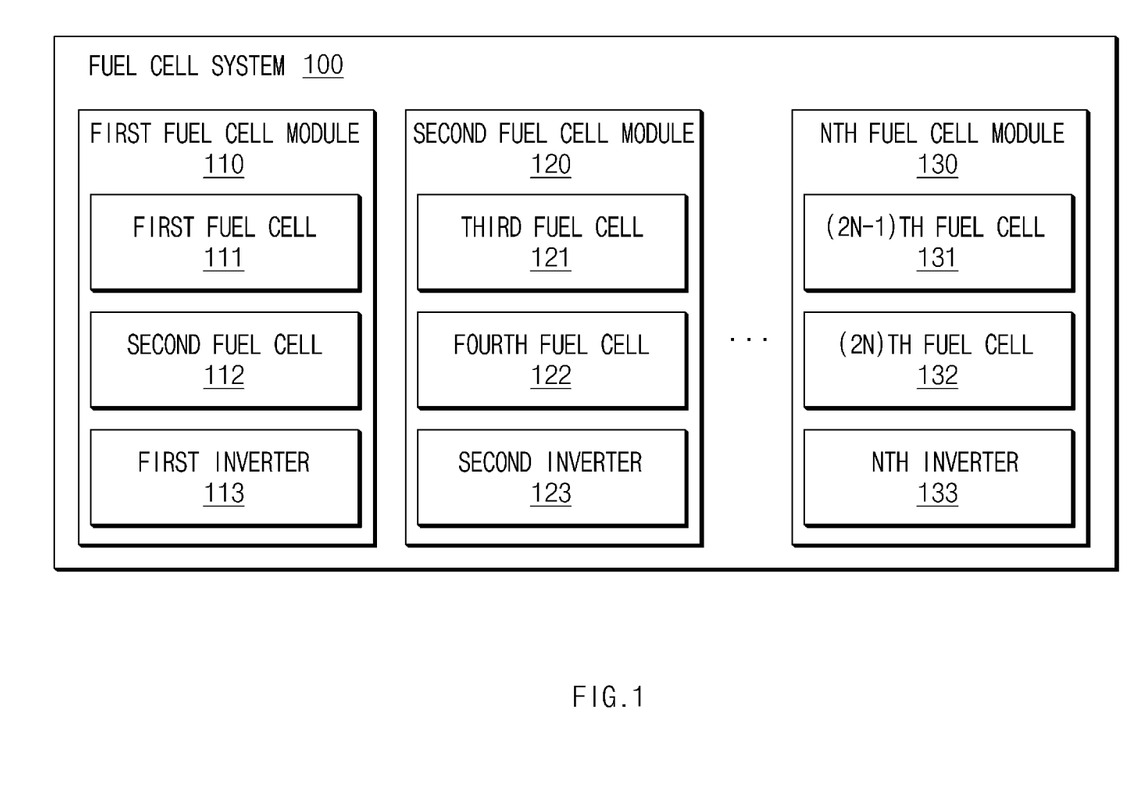
FIG. 1 is a block diagram illustrating a fuel cell system according to an embodiment of the present disclosure.

FIG. 1 is a block diagram illustrating a fuel cell system according to an embodiment of the present disclosure. A fuel cell system 100 may be included a vehicle which travels using a motor.

The fuel cell system 100 may be a fuel cell system for power generation, which uses hydrogen as fuel. The fuel cell system 100 may generate electricity by using hydrogen as the fuel of the anode. Electrons may generate electrical energy while moving from the anode to the cathode through an external wire by means of the entire reaction where hydrogen and oxygen react to become water.

The fuel cell system 100 may generate electricity by means of an electrochemical reaction of hydrogen stored in a hydrogen storage tank of the fuel cell system 100 and oxygen in the air. The fuel cell system 100 may deliver the generated electricity to the motor of the vehicle. The motor may rotate using electricity to generate power allowing the vehicle to travel. The vehicle including the fuel cell system 100 may discharge water as a by-product to reduce environmental pollution. Because the vehicle including the fuel cell system 100 drives using its electric motor, it may reduce noise generated by the vehicle while driving.

The fuel cell system 100 may include a plurality of fuel cell modules 110, 120, and 130. The fuel cell system 100 may be a high-capacity system for power generation, which is composed of the plurality of fuel cell modules 110, 120, and 130. The fuel cell system 100 may include three or more of fuel cell modules 110, 120, and 130. Thus, the plurality of fuel cell modules 110, 120, and 130 may include the first fuel cell module 110, the second fuel cell module 120, and an Nth (where N is a natural number of 3 or more) fuel cell module 130.

The first fuel cell module 110 may include a first fuel cell 111, a second fuel cell 112, and a first inverter 113. The second fuel cell module 120 may include a third fuel cell 121, a fourth fuel cell 122, and a second inverter 123. The Nth fuel cell module 130 may include a (2N−1)th fuel cell 131, a (2N)th fuel cell 132, and an Nth inverter 133. One fuel cell module may be composed of two fuel cells and one inverter. The inverter may control current input and output from the fuel cell module.

The plurality of fuel cell modules 110, 120, and 130 may be connected in the form of grid connection. The grid connection may be a power system connection scheme of connecting between two or more power systems through a line such that power move therebetween. When the plurality of fuel cell modules 110, 120, and 130 are connected in the form of grid connection, a transmission line, a transformer, or orthogonal transformation facilities may be connected between power systems. Thus, the plurality of fuel cell modules 110, 120, and 130 may be connected with a power grid in the form of grid connection.

Figure 2:
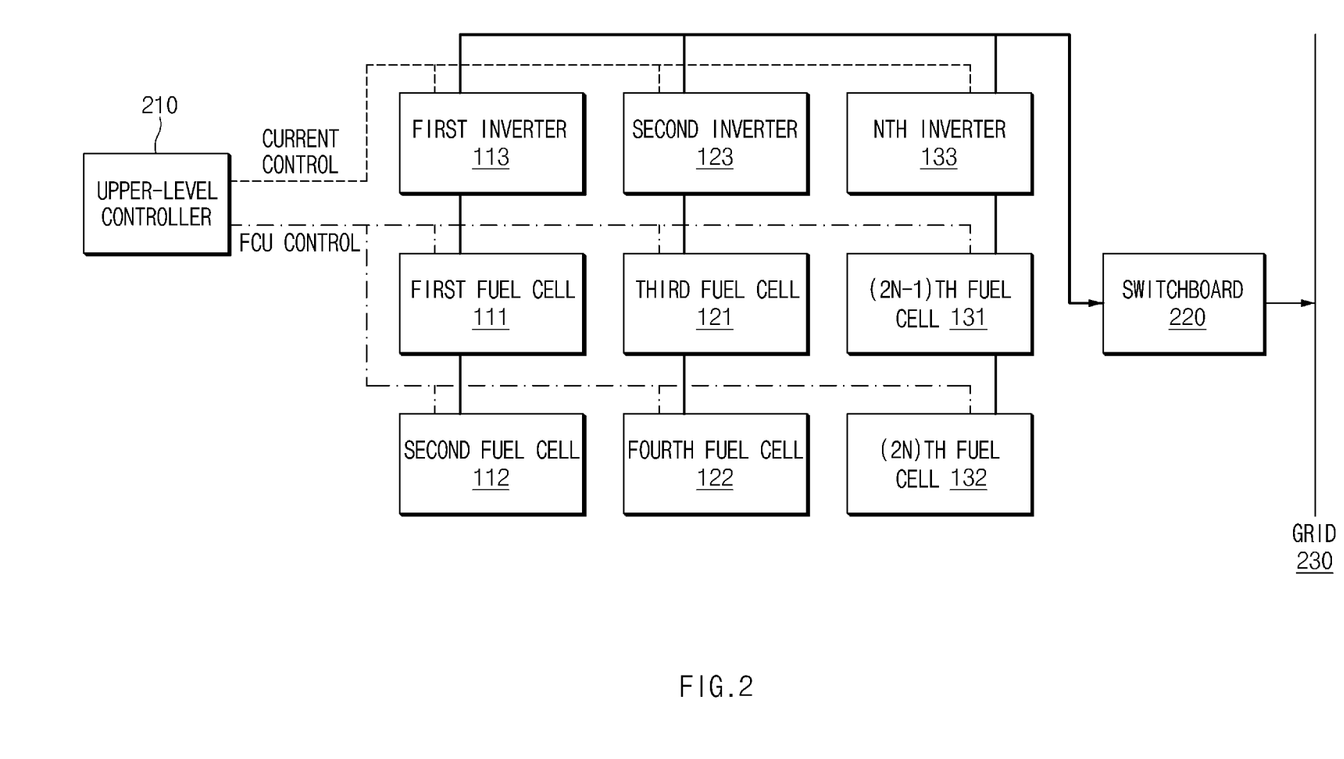
FIG. 2 is a drawing illustrating that a vehicle control apparatus controls a fuel cell system according to an embodiment of the present disclosure.

FIG. 2 is a drawing illustrating that a vehicle control apparatus controls a fuel cell system according to an embodiment of the present disclosure.

The vehicle control apparatus may include an upper-level controller 210 of the fuel cell system. The vehicle control apparatus may control the overall operation of the fuel cell system using the upper-level controller 210. The vehicle control apparatus may control an operation and stopping of the fuel cell system using the upper-level controller 210.

The upper-level controller 210 may perform power management control (PMC). The upper-level controller 210 may perform fuel cell control unit (FCU) control of a first fuel cell 111, a second fuel cell 112, a third fuel cell 121, a fourth fuel cell 122, a (2N−1)th fuel cell 131, and a (2N)th fuel cell 132. The upper-level controller 210 may control whether to use the first fuel cell 111, the second fuel cell 112, the third fuel cell 121, the fourth fuel cell 122, the (2N−1)th fuel cell 131, and the (2N)th fuel cell 132. The upper-level controller 210 may control the amount of energy output from the first fuel cell 111, the second fuel cell 112, the third fuel cell 121, the fourth fuel cell 122, the (2N−1)th fuel cell 131, and the (2N)th fuel cell 132.

The upper-level controller 210 may control current which is introduced into a first inverter 113, a second inverter 123, and an Nth inverter 133 or is output from the first inverter 113, the second inverter 123, and the Nth inverter 133. The upper-level controller 210 may control a direction and intensity of current which flows in the first inverter 113, the second inverter 123, and the Nth inverter 133.

The first fuel cell 111, the second fuel cell 112, and the first inverter 113 may be connected in the form of grid connection. The third fuel cell 121, the fourth fuel cell 122, and the second inverter 123 may be connected in the form of grid connection. The (2N−1)th fuel cell 131, the (2N)th fuel cell 132, and the Nth inverter 133 may be connected in the form of grid connection.

The first inverter 113, the second inverter 123, and the Nth inverter 133 may be connected with a switchboard 220 in the form of grid connection. The switchboard 220 may connect the first inverter 113, the second inverter 123, and the Nth inverter 133 with a grid 230. The first inverter 113, the second inverter 123, and the Nth inverter 133 may deliver electricity to the grid 230 through the switchboard 220. The grid 230 may deliver electricity to a motor of a vehicle.

Figure 3:
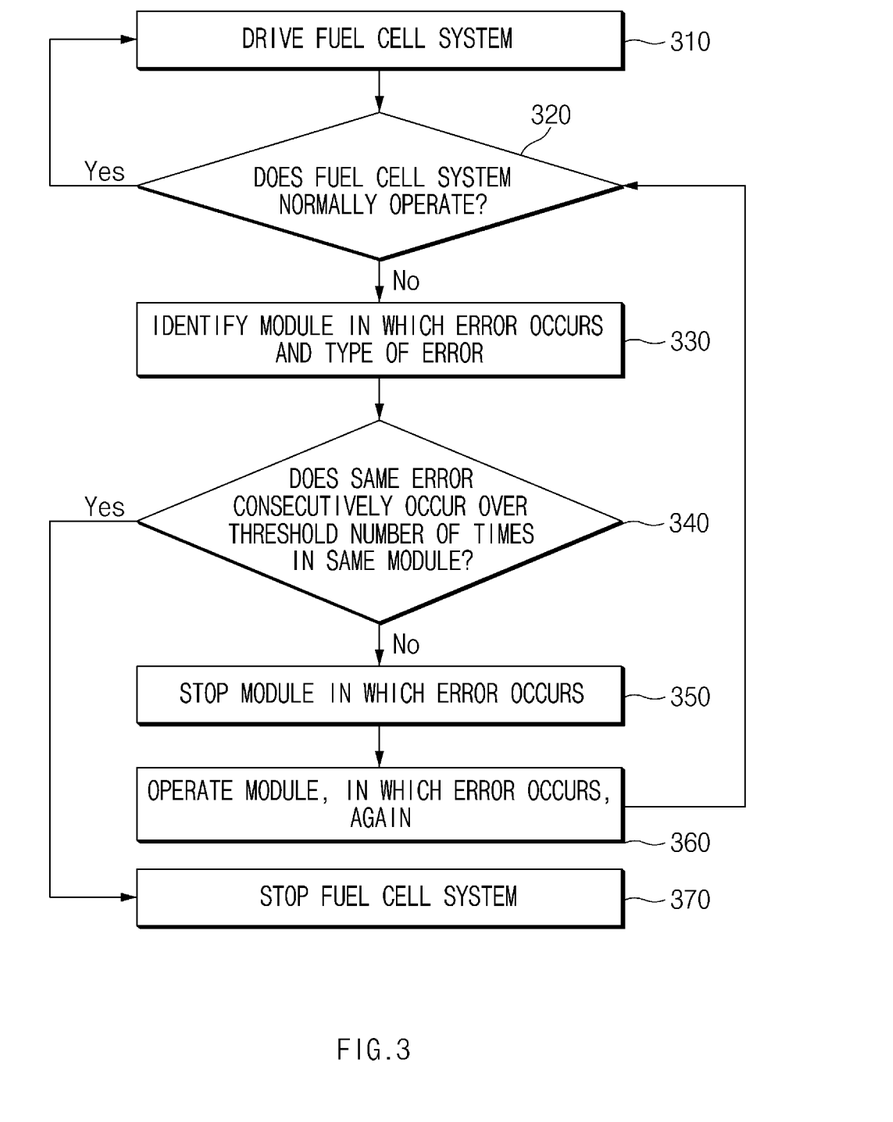
FIG. 3 is a flowchart illustrating a method for controlling a fuel cell system in a vehicle control apparatus according to an embodiment of the present disclosure.

FIG. 3 is a flowchart illustrating a method for controlling a fuel cell system in a vehicle control apparatus according to an embodiment of the present disclosure.

In operation, at step 310, the vehicle control apparatus may drive the fuel cell system. Before driving the fuel cell system, the vehicle control apparatus may maintain the fuel cell system in a stand-by state. The vehicle control apparatus may start to drive the fuel cell system in response to an electrical signal.

At step 320, the vehicle control apparatus may identify whether the fuel cell system normally operates. The vehicle control apparatus may identify whether an error occurs in the fuel cell system to identify whether the fuel cell system is normal or abnormal. When the fuel cell system normally operates (operation 320—Yes), the vehicle control apparatus may return to operation 310 to maintain the driving of the fuel cell system. When the fuel cell system does not normally operate (operation 320—No), the vehicle control apparatus may proceed with step 330.

At step 330, the vehicle control apparatus may identify a module in which the error occurs and an error type. When the fuel cell system does not normally operate, the vehicle control apparatus may determine that the error occurs in at least one of a plurality of fuel cell modules included in the fuel cell system. The vehicle control apparatus may detect a momentary and temporary error which occurs in a fuel cell module included in the fuel cell system for power generation. The vehicle control apparatus may store information associated with a position or a serial number of the fuel cell module in which the error occurs. When the same error occurs in the same fuel cell module, the vehicle control apparatus may increase an error count for the fuel cell module in which the error occurs.

The vehicle control apparatus may monitor an error type which occurs in the fuel cell module. The vehicle control apparatus may divide the error type which occurs in the fuel cell module. The vehicle control apparatus may divide the error type which occurs in the fuel cell module, depending on the position where the error occurs. The vehicle control apparatus may divide the error type which occurs in the fuel cell module into a power conversion device error, a fuel cell error, and a utility error.

At step 340, the vehicle control apparatus may identify whether the same error consecutively occurs over a threshold number of times in the same module. The vehicle control apparatus may identify whether the fuel cell module in which the error occurs is a fuel cell module in which the error previously occurs. When the error occurs in the same fuel cell module, the vehicle control apparatus may identify whether types of the errors are the same as each other. When the types of the errors are also the same as each other, the vehicle control apparatus may identify whether the number of times the same error consecutively occurs is greater than or equal to the threshold number of times. The threshold number of times may be a value previously stored in a memory of the vehicle control apparatus. The threshold number of times may be a value input by a user. The threshold number of times may be set to be the same for all types of errors. The threshold number of times may be set to be different depending on the error type. When the same error consecutively occurs over the threshold number of times in the same module, the vehicle control apparatus may proceed to operation 370 to stop the fuel cell system. The vehicle control apparatus may proceed to operation 350 for a case except for the case where the same error consecutively occurs over the threshold number of times in the same module.

At step 350, the vehicle control apparatus may stop the module in which the error occurs. The vehicle control apparatus may control whether to selectively operate or stop the each fuel cell module. The vehicle control apparatus may control whether to operate or stop the fuel cell system for each fuel cell module in response to the error which occurs in the fuel cell module. The vehicle control apparatus may selectively stop only the fuel cell module in which the error occurs except for the case where the same error occurs over the threshold number of times in the same module.

At step 360, the vehicle control apparatus may operate the module, in which the error occurs, again. The vehicle control apparatus may transmit a retry signal to operate the module, in which the error occurs, again. The vehicle control apparatus may monitor the error type for the fuel cell module which is stopped as the error occurs. When the error which occurs in the fuel cell module is momentary or temporary, when stopping and operating the fuel cell module again, the vehicle control apparatus may normally drive the fuel cell module. When the monitored error which occurs in the fuel cell module is momentary or temporary, the vehicle control apparatus may operate the fuel cell module again.

When the error occurs in an existing fuel cell system, the entire fuel cell system is stopped and a module in which the error occurs is checked. On the other hand, the vehicle control apparatus according to an embodiment of the present disclosure may stop and operate only the module, in which the error occurs, again except for the case where the same error consecutively occurs over the threshold number of times in the same module. Thus, the vehicle control apparatus may increase power generation efficiency and an operating rate of the fuel cell system. Furthermore, the vehicle control apparatus may selectively control the fuel cell module in which the error occurs to reduce unnecessary energy consumption of the fuel cell system.

Figure 4:
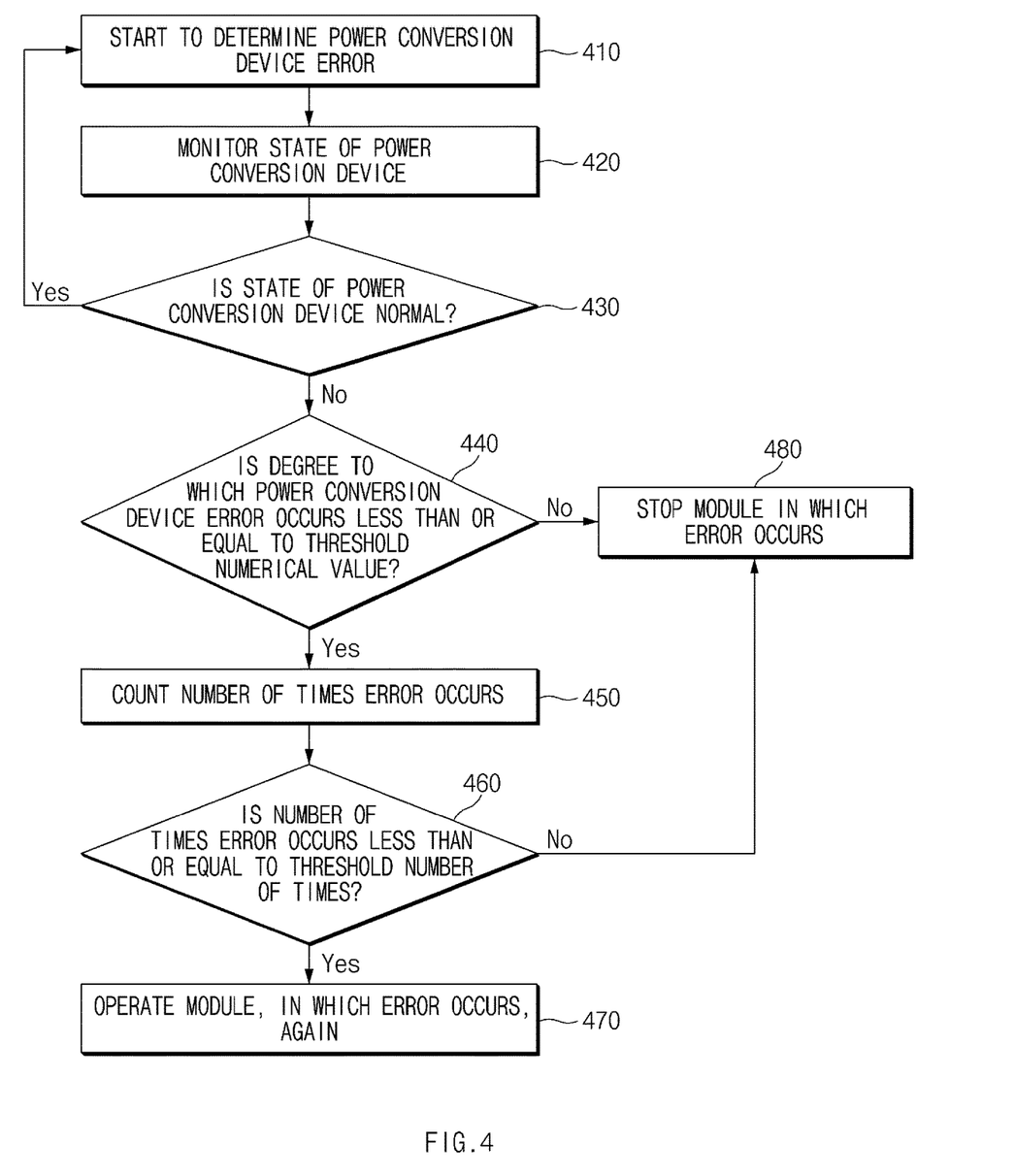
FIG. 4 is a flowchart illustrating a method of determining an error of a power conversion device according to an embodiment of the present disclosure.

FIG. 4 is a flowchart illustrating a method of determining an error of a power conversion device according to an embodiment of the present disclosure.

In operation, at step 410, a vehicle control apparatus may start to determine a power conversion device error. The power conversion device may convert direct current (DC) power generated by a fuel cell stack included in a fuel cell module into alternating current (AC) power by means of a power generation operation of a fuel cell system. When an error occurs in the fuel cell module, the vehicle control apparatus may start to determine the power conversion device error to identify whether an error type which occurs in the fuel cell module is the power conversion device error occurring in the power conversion device.

At step 420, the vehicle control apparatus may monitor a state of the power conversion device. The vehicle control apparatus may monitor whether the power conversion device is normal or abnormal depending on logic or an algorithm included in the determination of the power conversion device error.

At step 430, the vehicle control apparatus may identify whether the state of the power conversion device is normal. When the state of the power conversion device is normal, the vehicle control apparatus may return to operation 410 to maintain the determination of the power conversion device error. When a defect occurs in the state of the power conversion device, the vehicle control apparatus may proceed to step 440.

At step 440, the vehicle control apparatus may identify whether a degree to which the power conversion device error occurs is less than or equal to a threshold numeral value. The degree to which the error occurs may be digitalized according to a criterion determined in the logic or algorithm included in the determination of the power conversion device error. The threshold numerical value may be a value predetermined in the logic or algorithm included in the determination of the power conversion device error. The vehicle control apparatus may compare a value obtained by digitalizing the degree to which the error occurs with the threshold numerical value. At step 440, the vehicle control apparatus may divide the error which occurs in the power conversion device into a light failure (or a minor failure) and a serious failure (or a severe failure). When the degree to which the power conversion device error occurs is less than or equal to the threshold numeral value at step 440, the vehicle control apparatus may divide the error into the light failure. When the degree to which the power conversion device error occurs is greater than the threshold numeral value at step 440, the vehicle control apparatus may divide the error into the serious failure. When the degree to which the error occurs is less than or equal to the threshold numeral value (with step 440—Yes), the vehicle control apparatus may proceed to operation 450. When the degree to which the error occurs is greater than the threshold numeral value (with step 440—No), the vehicle control apparatus may proceed to operation 480 to stop the fuel cell module in which the error occurs.

At step 450, the vehicle control apparatus may count the number of times the error occurs. The vehicle control apparatus may count how many times the error has occurred in the power conversion device in which the error occurs. The vehicle control apparatus may store the counted number of times.

At step 460, the vehicle control apparatus may identify whether the number of times the error occurs is less than or equal to a threshold number of times. When the number of times the error occurs is less than or equal to the threshold number of times (operation 460—Yes), the vehicle control apparatus may proceed to operation 470. When the number of times the error occurs is greater than the threshold number of times (with step 460—No), the vehicle control apparatus may proceed to step 480 to stop the fuel cell module in which the error occurs.

At step 470, the vehicle control apparatus may operate the module, in which the error occurs, again. When the error which occurs in the power conversion device corresponds to the light failure and when the number of times the error occurs is less than or equal to the threshold number of times, the vehicle control apparatus may operate only the fuel cell module, in which the error occurs, again. The vehicle control apparatus may selectively operate the fuel cell module again to reduce the number of times the fuel cell module is stopped. In this case, the vehicle control apparatus may increase power generation efficiency and an operating rate of the fuel cell system. Furthermore, the vehicle control apparatus may selectively control the fuel cell module in which the power conversion device error occurs to reduce unnecessary energy consumption of the fuel cell system.

Figure 5:
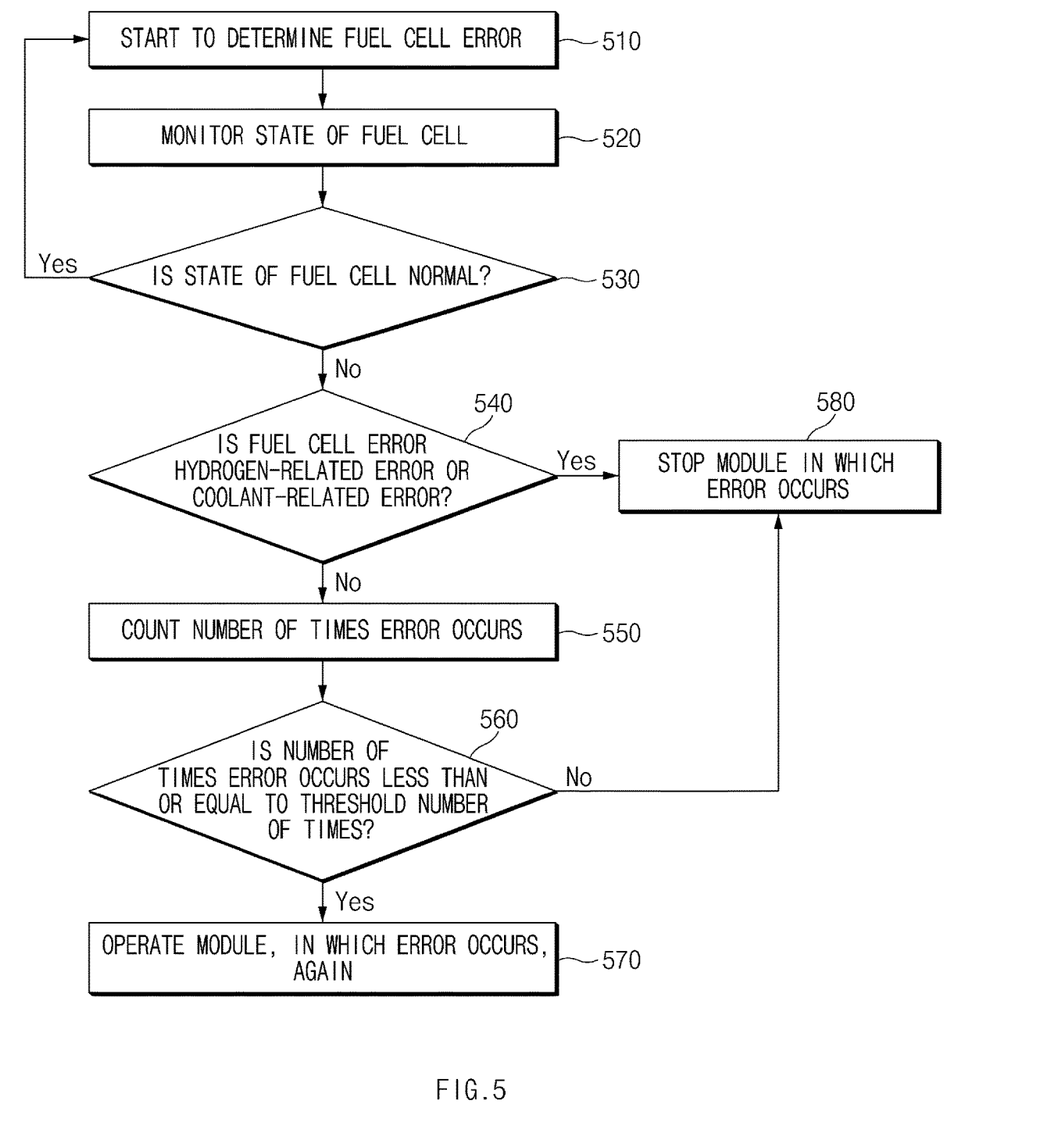
FIG. 5 is a flowchart illustrating a method for determining an error of a fuel cell according to an embodiment of the present disclosure.

FIG. 5 is a flowchart illustrating a method for determining an error of a fuel cell according to an embodiment of the present disclosure.

In operation, at step 510, a vehicle control apparatus may start to determine a fuel cell error. The fuel cell may be a power source for power generation of a fuel cell system. The fuel cell may include a stack that performs reaction of hydrogen and air, a blower which supplies air, and a coolant pump module which is responsible for cooling. When an error occurs in a fuel cell module, the vehicle control apparatus may start to determine the fuel cell error to identify whether an error type which occurs in the fuel cell module is a fuel cell error which occurs in the fuel cell.

At step 520, the vehicle control apparatus may monitor a state of the fuel cell. The vehicle control apparatus may monitor whether the fuel cell is normal or abnormal depending on logic or an algorithm included in the determination of the fuel cell error.

At step 530, the vehicle control apparatus may identify whether the state of the fuel cell is normal. When the state of the fuel cell is normal, the vehicle control apparatus may return to operation 510 to maintain the determination of the fuel cell error. When a defect occurs in the state of the fuel cell, the vehicle control apparatus may proceed to step 540.

At step 540, the vehicle control apparatus may identify whether the fuel cell error is a hydrogen-related error or a coolant-related error. In operation 540, the vehicle control apparatus may divide the error which occurs in the fuel cell into a hydrogen- or coolant-related error and the other error depending on contents of the error. The hydrogen- or coolant-related error may include leak of hydrogen or insufficiency of a coolant. The hydrogen- or coolant-related error may cause a serious problem with the safety of the fuel cell system. When the fuel cell error is the hydrogen-related error or the coolant-related error in operation 540 (operation 540—Yes), the vehicle control apparatus may proceed to operation 580 to stop the fuel cell module in which the error occurs. When the fuel cell error is the other error (operation 540—No), the vehicle control apparatus may proceed with step 550.

At step 550, the vehicle control apparatus may count the number of times the error occurs. The vehicle control apparatus may count how many times the error has occurred in the fuel cell in which the error occurs. The vehicle control apparatus may store the counted number of times.

At step 560, the vehicle control apparatus may identify whether the number of times the error occurs is less than or equal to a threshold number of times. When the number of times the error occurs is less than or equal to the threshold number of times (with step 560—Yes), the vehicle control apparatus may proceed to operation 570. When the number of times the error occurs is greater than the threshold number of times (with step 560—No), the vehicle control apparatus may proceed to operation 580 to stop the fuel cell module in which the error occurs.

At step 570, the vehicle control apparatus may operate the module, in which the error occurs, again. When the error which occurs in the fuel cell corresponds to the other error and when the number of times the error occurs is less than or equal to the threshold number of times, the vehicle control apparatus may operate only the fuel cell module, in which the error occurs, again. The vehicle control apparatus may selectively operate the fuel cell module again to reduce the number of times the fuel cell module is stopped. In this case, the vehicle control apparatus may increase power generation efficiency and an operating rate of the fuel cell system. Furthermore, the vehicle control apparatus may selectively control the fuel cell module in which the fuel cell error occurs to reduce unnecessary energy consumption of the fuel cell system.

Figure 6:
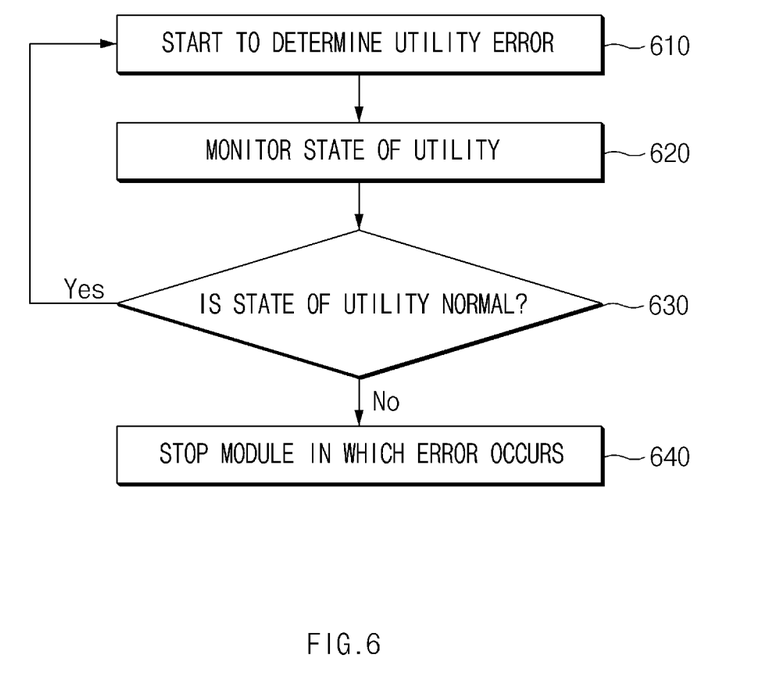
FIG. 6 is a flowchart illustrating a method for determining an error of a utility according to an embodiment of the present disclosure.

FIG. 6 is a flowchart illustrating a method for determining an error of a utility according to an embodiment of the present disclosure.

In operation, at step 610, a vehicle control apparatus may start to determine a utility error. The utility may include an infrastructure and various facilities, which are capable of generating electricity in a fuel cell system. The utility may include a hydrogen supply and integrated cooling control module. When an error occurs in the fuel cell module, the vehicle control apparatus may start to determine the utility error to identify whether an error type which occurs in the fuel cell module is the utility error which occurs in the utility.

In operation 620, the vehicle control apparatus may monitor a state of the utility. The vehicle control apparatus may monitor whether the utility is normal or abnormal depending on logic or an algorithm included in the determination of the utility error.

At step 630, the vehicle control apparatus may identify whether the state of the utility is normal. When the state of the utility is normal, the vehicle control apparatus may return to step 610 to maintain the determination of the utility error. When a defect occurs in the state of the fuel cell, the vehicle control apparatus may proceed to step 640.

At step 640, the vehicle control apparatus may stop the fuel cell module in which the error occurs. The error associated with hydrogen supply and integrated cooling may cause a serious problem with the safety of the fuel cell system. When the error occurs in the utility, the vehicle control apparatus may determine that the error associated with the hydrogen supply and integrated cooling occurs. When the utility error associated with the hydrogen supply and integrated cooling occurs, the vehicle control apparatus may stop the fuel cell module in which the error occurs without trying to operate the fuel cell module, in which the error occurs, again. In this case, when the serious problem with the safety of the fuel cell system occurs, the vehicle control apparatus may stop the fuel cell system in which the error occurs to increase the safety of the fuel cell system FIG. 7 is a block diagram illustrating a computing system according to an embodiment of the present disclosure.

Figure 7:
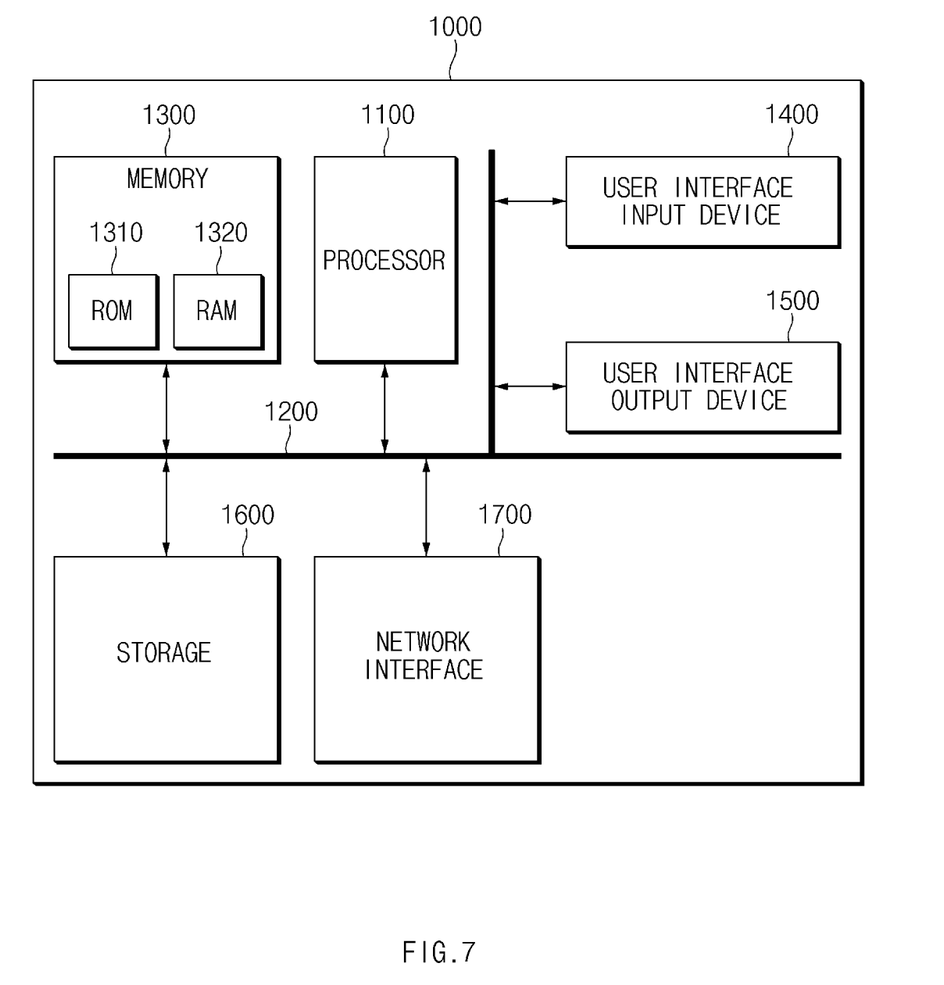
FIG. 7 is a block diagram illustrating a computing system according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may increase power generation efficiency and an operating rate of a fuel cell system for each fuel cell module with respect to an error occurring in the fuel cell system.

Furthermore, the present technology may operate the fuel cell system for each fuel cell module to selectively control a fuel cell module in which an error occurs, when the error occurs, thus reducing unnecessary energy consumption of the fuel cell system.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle control apparatus for controlling a fuel cell system, the vehicle control apparatus comprising:

a processor; and a memory storing instructions that, when executed by the processor, cause the processor to perform operations comprising:

identifying a fuel cell module in which an error occurs among fuel cell modules included in the fuel cell system and an error type;

stopping the fuel cell system, when a number of times the same error consecutively occurs is greater than or equal to a predetermined threshold value;

stopping the fuel cell module in which the error occurs, when the number of times the same error consecutively occurs is smaller than the predetermined threshold value; and operating the fuel cell module, in which the error occurs, again, wherein only the fuel cell module in which the error occurs is operated again when a degree of the error occurring in a power conversion device is less than or equal to a first threshold numerical value and the number of times the error occurs is less than or equal to a threshold number of times, when the error type is a power conversion device error occurring in the power conversion device.

2. The vehicle control apparatus of claim 1, wherein each of the fuel cell modules is composed of two fuel cells and one inverter.

3. The vehicle control apparatus of claim 1, wherein the error, which is momentary and temporary, occurring in the fuel cell module is detected.

4. The vehicle control apparatus of claim 1, wherein information associated with a position or a serial number of the fuel cell module in which the error occurs is stored.

5. The vehicle control apparatus of claim 1, wherein an error count for the fuel cell module in which the error occurs is increased when the error is the same error occurring in the same fuel cell module.

6. The vehicle control apparatus of claim 1, wherein the error type is divided into a power conversion device error, a fuel cell error, and a utility error depending on a position where the error occurs.

7. The vehicle control apparatus of claim 1, wherein the fuel cell module in which the error occurs is stopped, when the error type is a utility error associated with hydrogen supply and integrated cooling.

8. A control method of a fuel cell system, the control method comprising:

identifying a fuel cell module in which an error occurs among fuel cell modules included in the fuel cell system and an error type;

stopping the fuel cell system, when a number of times the same error consecutively occurs is greater than or equal to a predetermined threshold value;

stopping the fuel cell module in which the error occurs, when the number of times the same error consecutively occurs is smaller than the predetermined threshold value; and operating the fuel cell module, in which the error occurs, again, wherein only the fuel cell module in which the error occurs is operated again when a degree of the error occurring in a power conversion device is less than or equal to a threshold numerical value and the number of times the error occurs is less than or equal to a threshold number of times, when the error type is a power conversion device error occurring in the power conversion device.

9. The control method of claim 8, wherein each of the fuel cell modules is composed of two fuel cells and one inverter.

10. The control method of claim 8, wherein the error, which is momentary and temporary, occurring in the fuel cell module is detected.

11. The control method of claim 8, wherein information associated with a position or a serial number of the fuel cell module in which the error occurs is stored.

12. The control method of claim 8, wherein an error count for the fuel cell module in which the error occurs is increased when the error is the same error occurring in the same fuel cell module.

13. The control method of claim 8, wherein the error type is divided into a power conversion device error, a fuel cell error, and a utility error depending on a position where the error occurs.

14. The control method of claim 8, wherein the fuel cell module in which the error occurs is stopped, when the error type is a utility error associated with hydrogen supply and integrated cooling.

* * * * *